W. ZIEMSEN.
BAKER'S OVEN.
APPLICATION FILED JULY 1, 1920.

1,414,717.

Patented May 2, 1922.
2 SHEETS—SHEET 1.

Inventor
Wilhelm Ziemsen
By
Attorney

W. ZIEMSEN.
BAKER'S OVEN.
APPLICATION FILED JULY 1, 1920.

1,414,717.

Patented May 2, 1922.
2 SHEETS—SHEET 2.

UNITED STATES PATENT OFFICE.

WILHELM ZIEMSEN, OF BRUNSWICK, GERMANY.

BAKER'S OVEN.

1,414,717.　　　　Specification of Letters Patent.　　Patented May 2, 1922.

Application filed July 1, 1920. Serial No. 393,477.

*To all whom it may concern:*

Be it known that I, WILHELM ZIEMSEN, master locksmith, a citizen of the Republic of Germany, residing at Brunswick, Germany, 12 Gördelingerstrasse, have invented certain new and useful Improvements in Bakers' Ovens, (for which I have filed an application in Germany, Feb. 15, 1919,) of which the following is a specification.

My invention refers to bakers' ovens and more especially to novel means for heating two baking chambers selectively from a single burner by means of oil.

One object of the invention is to provide a heating burner mounted at the end of a swinging pipe which is connected to a fuel supply arranged between the two baking chambers so that the burner may be shifted from one baking chamber to the other.

Another object of my invention is the provision of a burner selectively operable in one of a plurality of baking chambers in which the fuel is atomized by fluid pressure.

Another object is to provide means for automatically reducing the flame in said burner when the latter is withdrawn from a baking chamber.

Still another object is to provide means whereby the fluid pressure utilized in atomizing the fuel is generated in one of the ovens.

The structure embodying my invention is shown by way of example in the annexed drawings, in which:—

Figure 1:
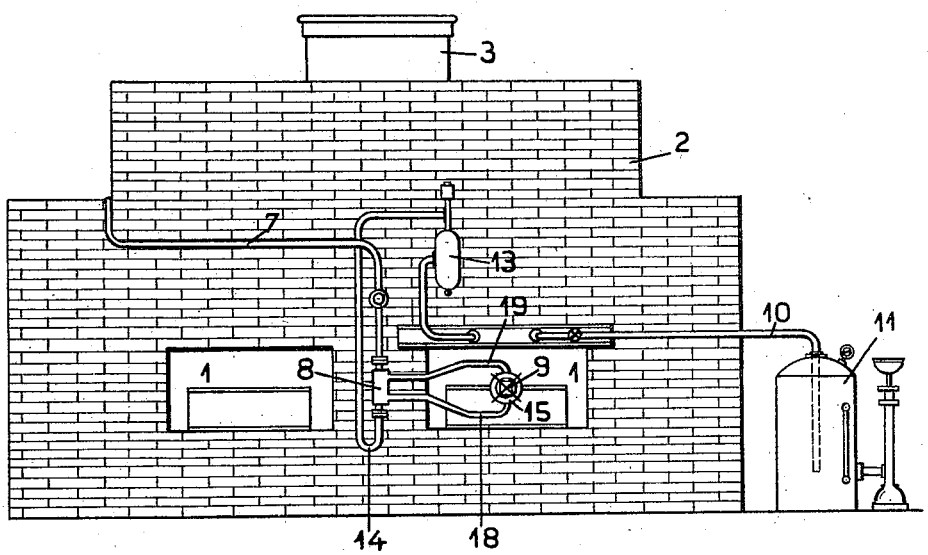
Figure 1 is a front elevation of a baker's oven.

Referring in detail to the drawings, the oven 2 is provided with two baking chambers 1 between which is arranged a vertical portion of a stationary fuel supply pipe 7 which leads to a liquid fuel tank 3, located preferably above the level of the burner so as to supply the fuel to the burner by pressure of gravity.

Leading upwardly toward the vertical portion of the fuel supply pipe 7 and in alignment therewith is the vertical portion of a steam supply pipe 14. The ends of these pipes are in communication with a swinging joint 8 comprising a solid metal portion having sockets at its upper and lower ends by means of which it is journaled on the ends of the fuel supply and steam supply pipes respectively. From one side of the joint 8 and in communication respectively with the upper and lower sockets of said joint extend hollow arms 19 and 18 attached to and communicating with the upper and lower sides of the burner. The mode attachment of said arms with the burner is such as to give said burner freedom of movement relative thereto.

Within the baking chamber 1 and preferably near the roof thereof is a steam generating coil 12 supplied with water from the supply container 11 through the conduit 10.

Any source of pressure may be used to lift the water. The steam on its way to the burner passes through the steam trap 13.

Figure 3:
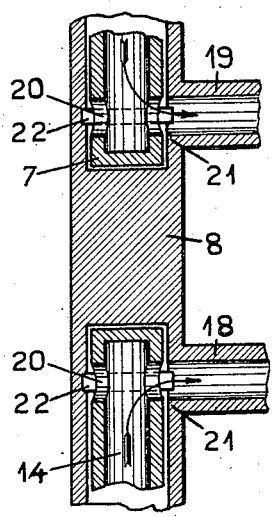
Figure 3 is a longitudinal sectional view of the swinging connection from the supply pipes to the burner.
Figure 2:
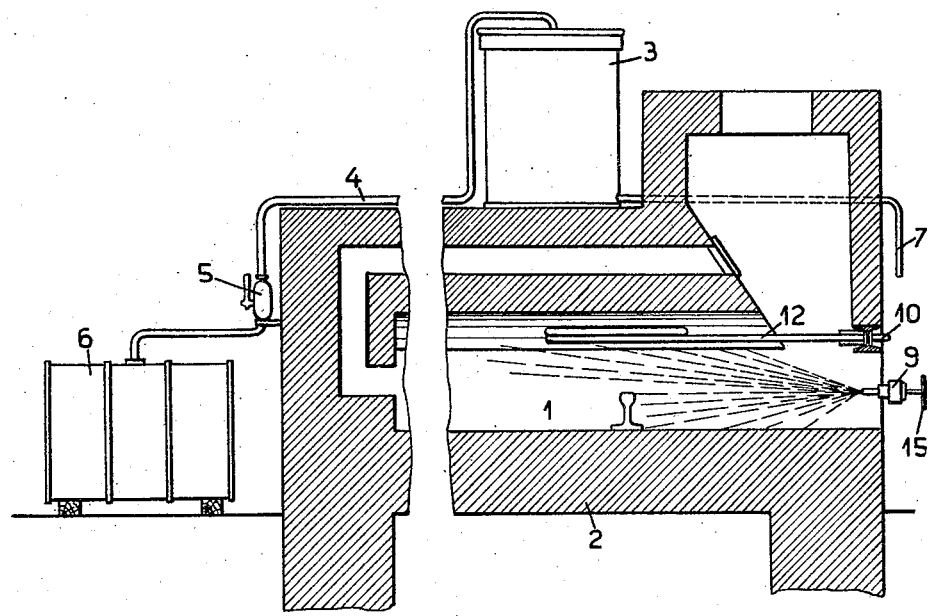
Figure 2 is a cross section view of one of the heating chambers.

The ends of the fuel and water supply pipes 7 and 14 with the sockets of the joint 8, are closed but are provided near the ends with oppositely aligned transverse openings 20 and 21 of such size as to give free comunication between the supply pipes and the hollow arms 19 and 18 when the joint is in the position shown in Figure 3 or at an angle of 180° thereto. At intermediate angles of swing the apertures are more or less out of registry with the openings of the hollow arms 19 and 18, a limited communication being, however, maintained by means of a small groove 22 running circumferentially around each of the sockets in the plane of the apertures 20 and 21.

By this construction both the fuel and fluid pressure supply to the burner are cut down while the burner is being swung and the disadvantage of having a huge flame exposed outside the baking chamber is avoided. A system of valves in the supply pipes gives control of the size of the flame issuing from the burner at all times. The gravity tank 3 is adapted to be filled by any convenient means such as the pump 5 drawing from the container 6.

For preliminary starting with a cold oven it is of course obvious that the steam must be gotten up by some auxiliary source of heat such as a wood or paper fire built in the baking chamber.

I claim:

1. In a baker's oven in combination, two baking chambers, a swinging pipe joint between said chambers, a burner adapted to be oscillated about said joint so as to alternatively heat one or the other chamber, and means for supplying said burner with liquid fuel and spraying means through said joint, whenever the burner is in operative position.

2. In a baker's oven in combination, two baking chambers, a pipe joint between said chambers, a burner adapted to be oscillated about said joint so as to alternatively heat one or the other chamber, means for supplying said burner with liquid fuel and spraying means through said joint, whenever the burner is in operative position and a groove in said joint permitting small quantities of fuel and spraying means to pass through to the burner while it is in inoperative position.

3. In combination a baker's oven comprising a plurality of baking chambers, a burner shiftably mounted to selectively serve any one of said baking chambers, means for supplying liquid fuel to said burner and fluid pressure means for atomizing the fuel.

4. In combination a baker's oven comprising a plurality of baking chambers, a burner shiftably mounted to selectively serve any one of said chambers, a steam coil in one of said chambers, means for supplying liquid fuel to said burner and a conduit from said steam coil to said burner to supply steam to said burner for atomizing the fuel.

5. In combination a baker's oven, comprising a plurality of baking chambers, a burner shiftably mounted to selectively serve any one of said chambers, a steam coil in one of said chambers, means for supplying liquid fuel to the burner, means for supplying water to the steam coil and means to conduct steam from the steam coil to the burner.

6. In combination a baker's oven comprising a plurality of baking chambers, a burner swingably mounted to selectively serve any one of said chambers, means for supplying fuel to said burner and means for automatically reducing the supply of fuel to said burner during the act of swinging said burner from one chamber to another.

In testimony whereof I affix my signature in presence of two witnesses.

WILHELM ZIEMSEN.

Witnesses:
WILHELM LELUKE,
HERM. VAHLBERG.